(12) United States Patent
Bleisteiner et al.

(10) Patent No.: US 7,254,207 B2
(45) Date of Patent: Aug. 7, 2007

(54) METHOD AND APPARATUS FOR TRANSMITTING AND RECIEVING MULTIPLEX TRIBUTARY SIGNALS

(75) Inventors: Bernd Markus K. Bleisteiner, Fuerth (DE); Miguel Robledo, Bavaria (DE); Konrad Sticht, Eschenbach (DE); Ralph Steffen Urbansky, Kaiserslautern (DE)

(73) Assignee: Lucent Technologies Inc., Murray Hill, NJ (US)

( * ) Notice: Subject to any disclaimer, the term of this patent is extended or adjusted under 35 U.S.C. 154(b) by 581 days.

(21) Appl. No.: 10/166,897

(22) Filed: Jun. 11, 2002

(65) Prior Publication Data

US 2002/0191724 A1 Dec. 19, 2002

(30) Foreign Application Priority Data

Jun. 15, 2001 (EP) ................................. 01305212

(51) Int. Cl.
*H04L 7/00* (2006.01)
(52) U.S. Cl. ...................... 375/372; 375/371; 370/505; 370/535
(58) Field of Classification Search ........ 375/371–372; 376/505–539
See application file for complete search history.

(56) References Cited

U.S. PATENT DOCUMENTS

| | | | | |
|---|---|---|---|---|
| 4,755,987 A * | 7/1988 | Lee et al. | .................... | 370/479 |
| 4,759,018 A * | 7/1988 | Buchner | ..................... | 370/535 |
| 4,811,340 A * | 3/1989 | McEachern et al. | ........ | 370/505 |
| 5,263,057 A | 11/1993 | Nawrocki et al. | | |
| 5,796,796 A * | 8/1998 | Wang | .......................... | 375/372 |
| 6,870,859 B1 * | 3/2005 | Kozaki et al. | .............. | 370/535 |
| 2001/0021203 A1 * | 9/2001 | Takizawa et al. | ........... | 370/539 |
| 2001/0022826 A1 * | 9/2001 | Rude | ........................ | 375/371 |

FOREIGN PATENT DOCUMENTS

EP 1 067 722 A2 1/2001

OTHER PUBLICATIONS

"Waiting Time Jitter Reduction by Synchronizer Stuff Threshold Modulation" by W.D. Grover, IEEE Nov. 1987.
"Measured Pulse-Shifting Jitter in Asynchronous DS-1/SONET Multiplexing With and Without Stuff-Threshold Modulation Circuit" by W.D. Grover, IEEE, Jun. 1987.
W. D. Grover et al., "Waiting Time Jitter Reduction By Synchronizer Stuff Thresold Modulation", *Global Telecommunications Conferecence, Tokyo, Nov. 15-18, 1987, Proceedings of the Global Telecommunications Conference and Exhibition (Globecom), New York,* vol. 1, pp. 13701-13705.

(Continued)

*Primary Examiner*—Khai Tran
*Assistant Examiner*—Cicely Ware

(57) ABSTRACT

A method and apparatus are provided for transmitting and receiving a plurality of individual tributary signals in multiplex form via a common line. At the transmitting end, the tributary signals, each of which has a similar initial frequency, are converted into a compound signal having a frame structure with a common data rate. At the receiving end, each individual tributary signal is retrieved from the compound signal with its initial frequency. A phase information signal portion including a respective phase difference between each tributary signal and the compound signal is formed and inserted into the compound signal in the shape of respective coded bits. The initial frequency of each tributary signal is recovered from the phase information signal portion included in the respective coded bits belonging to the respective tributary signals.

7 Claims, 4 Drawing Sheets

OTHER PUBLICATIONS

W. D. Grover et al., "Measured Pulse-Stuffing Jitter in Asynchronous DS-1/SONET Multiplexing With and With Stuff-Threshold Modulation Circuit", *Electronics Letters, IEE Stevenage, GB*, vol. 23, No. 18, Aug. 27, 1987, pp. 959-961.

* cited by examiner

METHOD AND APPARATUS FOR TRANSMITTING AND RECIEVING MULTIPLEX TRIBUTARY SIGNALS

CROSS-REFERENCE TO RELATED APPLICATION

This application claims the benefit of priority from corresponding European Application Serial No. 01305212.1, filed Jun. 15, 2001.

1. Technical Field

The invention relates to a method and an apparatus for transmitting and receiving a plurality of individual tributary signals in multiplex form via a common line.

2. Background of the Invention

A data line can carry a plurality of signals originating from a plurality of individual sources. In practice, a plurality of signals of nominally the same frequency termed "tributary signals" are multiplexed and transmitted via the common line as a "compound signal". The multiplexed signals are mapped into the compound signal that has a frame structure and is of a higher data rate than the sum of the tributary frequencies. The compound signal is received at the receiver and is demultiplexed. The individual tributary signals so obtained should be identical to the original tributary signals before being multiplexed at the transmitter. This means that the frequency of each demultiplexed tributary signal ("the recovered clock") should be identical to the frequency of the original signal.

In order to adapt to the common data rate of the compound signal, additional bits are used. This offers the possibility to transmit initial tributary signals of somewhat different frequencies. Some of the additional bits are used to transmit control information needed for the rate adaptation of these tributary signals. Some of the additional bits can also be used to transmit some other additional information. The additional bits are put in a fixed position into the framed compound signal. Rate adaptation is made by a stuffing procedure. To that end, gaps are provided in fixed frame positions, wherein information data can be inserted, or which can be left empty. When the initial tributary frequency is lower than the nominal rate, these gaps remain empty (positive stuffing). When the initial tributary frequency is higher than the nominal rate, some of the bits are inserted in the empty positions (negative stuffing). The tributary signals which are adapted in rate, are multiplexed, that is, the bits or bytes of the signals are interleaved and transmitted to the receiver through the common line. For recovering the tributary signals at the receiver, the signals are demultiplexed. For recovering the frequency or clock, phase information transmitted with the compound signal is used, namely the phase difference between the compound signal and the tributary signal. This phase difference is transmitted in the gaps provided in the fixed frame positions and causes no significant harm. However, the stuffing information results in a rough quantization of the phase, which causes wander and jitter of the recovered frequency or clock.

SUMMARY OF THE INVENTION

Wander and jitter in a compound signal are reduced according to the principles of the invention. According to one illustrative embodiment, the phase difference between the compound signal and the tributary signal is accurately calculated in the transmitter. This calculated phase difference is coded preferably by a binary number and is transmitted in dedicated bytes of the compound line signal. In the receiver, the initial frequency of each tributary signal is recovered using the transmitted phase information. The accurate calculation of the phase difference is obtained by using an auxiliary clock at the transmitter. Furthermore, the mean value of the phase difference is calculated for a fixed time interval where the mean value is obtained by an integrator.

BRIEF DESCRIPTION OF THE DRAWING

A more complete understanding of the invention may be obtained from consideration of the following detailed description of the invention in conjunction with the drawing, with like elements referenced with like reference numerals, in which.

DETAILED DESCRIPTION

Figure 1:
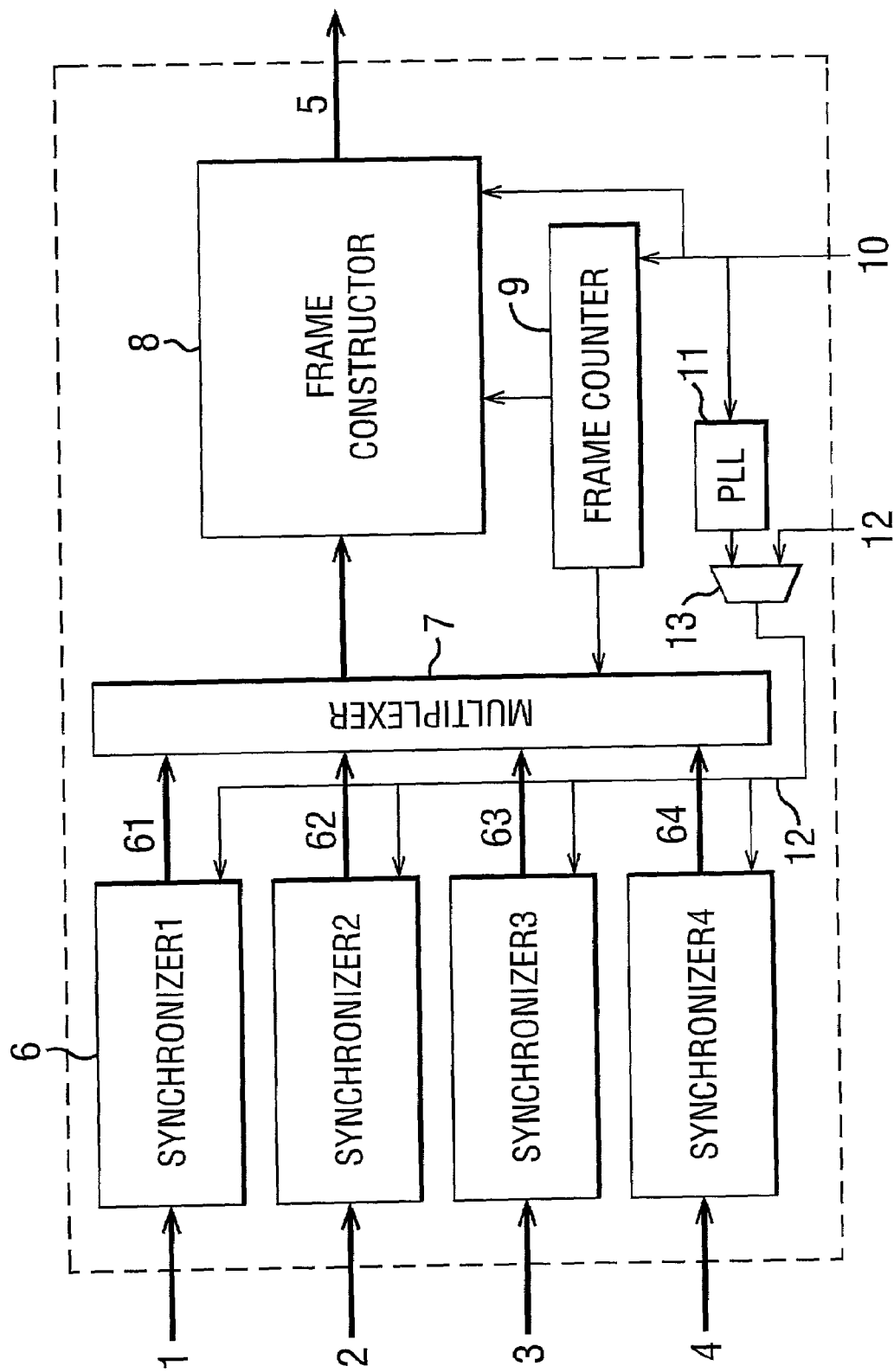
FIG. 1 is a block diagram of a transmitter according to an illustrative embodiment of the invention.

FIG. 1 shows a transmitter for inputting four tributary signals 1, 2, 3, 4 and outputting a line compound signal 5 which includes all data of the tributary signals and some control data and may have a frequency of 10 GHz, by way of example. Each tributary signal is delivered to a respective synchronizer 6 which prepares a rate adapted tributary signal 61 that is then interleaved by multiplexer 7 with the remaining rate adapted tributary signals 62, 63, and 64. Multiplexer 7 composes the data of the tributary signals 61 to 64 and delivers such composed signal to a frame constructor 8 which finally outputs the line compound signal via line 5. The frame constructor is controlled by a frame counter 9 and a system clock 10 having the frequency of the line compound signal. The system clock 10 is also delivered to the frame counter 9 and a phase-locked loop 11, which outputs an internally generated auxiliary clock. The output of the phase-locked loop 11 and a further auxiliary clock 12 are delivered to a gate 13 so that the auxiliary clock 12 can be made effective for each of synchronizers 6. The auxiliary clock 12 is an uncorrelated cycle to the writing cycle and the reading cycle and is used to obtain a higher resolution of the phase difference between signals.

Cycle adaptation, which is aimed at, makes it necessary to use a plurality of gate functions. For this reason, cycle adaptation is realized in CMOS technology, which allows a relative low frequency of 78 MHz, by way of example only (in relation to 10 GHz of the compound signal 5). Therefore, the serial data are transformed to parallel data and are written with this low frequency into a memory and read out with a similar low frequency from the memory.

Figure 2:
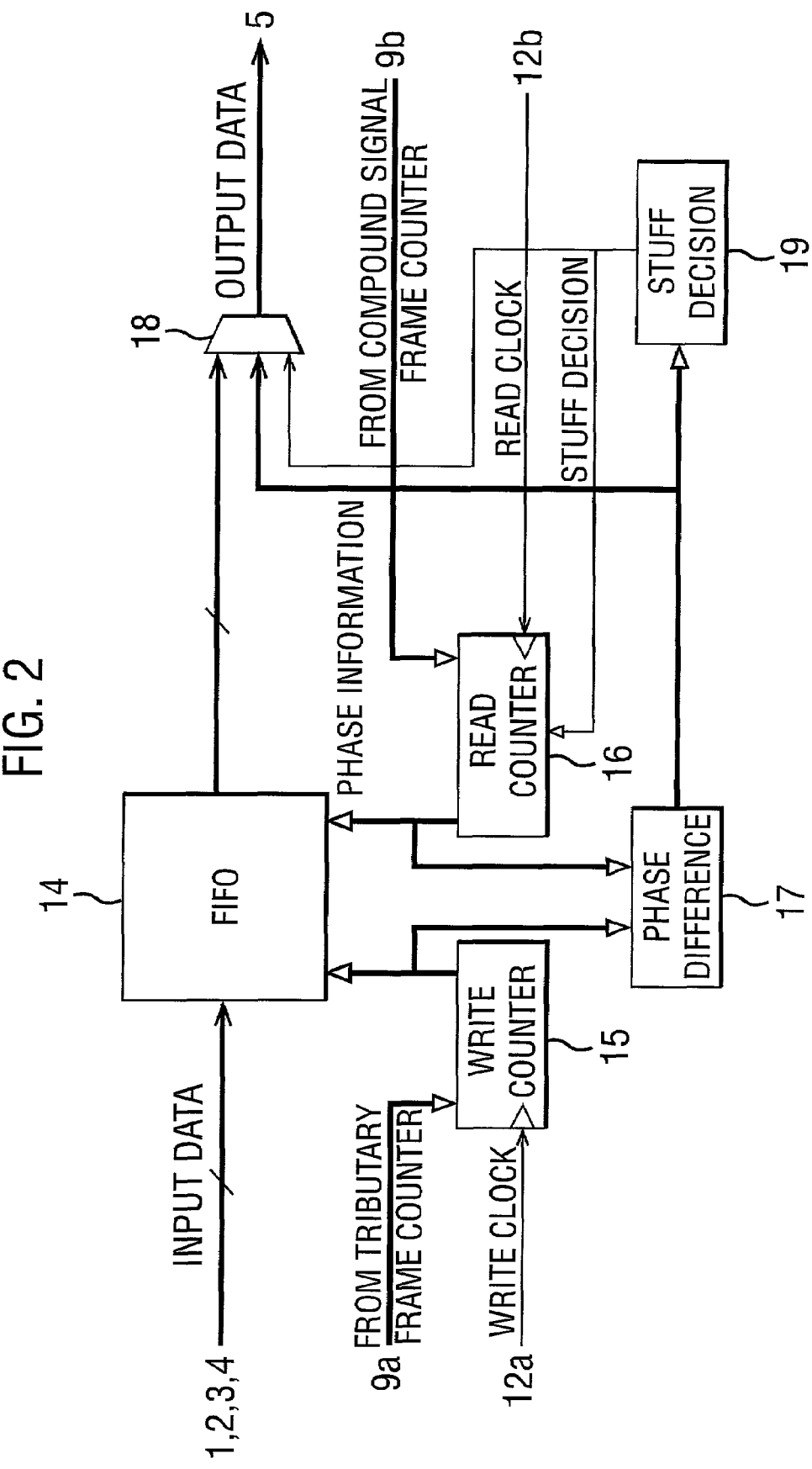
FIG. 2 is a block diagram of a synchronizer according to an illustrative embodiment of the invention.

FIG. 2 shows particulars of each synchronizer 6. Input data from one of the tributary signals 1 through 4 is delivered to a FIFO register 14, which is controlled by a write counter 15 and a read counter 16. The write counter 15 is operated by a write clock 12a and receives the numbers of the bits in the tributary signal via line 9a. The read counter 16 is operated by a read clock 12b and receives the number of the bits from the compound signal through line 9b. The register 14 is an elastic store which provides write-in positions (write address) for the data bits of the respective tributary signals 1 to 4, and read-out positions (read address)

for reading out these data bits together with bit gaps as provided by the frame structure of the compound signal. A phase difference unit 17 is provided which, by the operation of the write counter 15 and the read counter 16, forms or calculates a phase difference between each tributary signal and the compound signal.

In detail, the phase difference is formed between write and read address of register 14. The resolution obtained with this measurement corresponds to the cycle time of the writing cycle or the reading cycle, that is, phase difference measurement is made synchronously with one of these cycles. However, this resolution is not sufficient to fulfill the requirements as to jitter at the output of the tributary signal. Furthermore, the phase difference between write and read address is changing continuously, and measurement is only a rough quantization of this phase difference, This is the reason why the auxiliary clock 12 is used which is uncorrelated to the writing and reading cycle and allows measurement at fine stepped times. The auxiliary clock 12 drifts slowly so that, in a measuring period, the clock shifts through all possible positions during a cycle time period of the writing or reading cycle. Additionally an average value is formed for a defined measuring period which corresponds to the distance between two stuffing positions, e.g., the measured values are integrated across the measuring time. The average value obtained allows for one of the following decision stuffing positively, stuffing negatively, or no stuffing. Formation of such average value allows for calculating the influence of the gaps which, due to the frame construction, occur regularly.

The phase difference unit 17 makes a binary number from the average phase difference and delivers such coded phase information to a data output gate 18. The coded phase information is also delivered to a stuff decision unit 19 which has outputs connected to the read counter 16 and the output data gate 18.

The auxiliary clock 12, with its portions write clock 12a and read clock 12b, allows the accurate calculation of the phase difference between the line signal 5 and the tributary signals 1, 2, 3, and 4, respectively. The phase difference unit 17 includes the integrator referred to above which, for a fixed time interval, forms the mean or average value of the phase difference that is the basis for calculating the phase difference between line signal and tributary signal.

Figure 3:
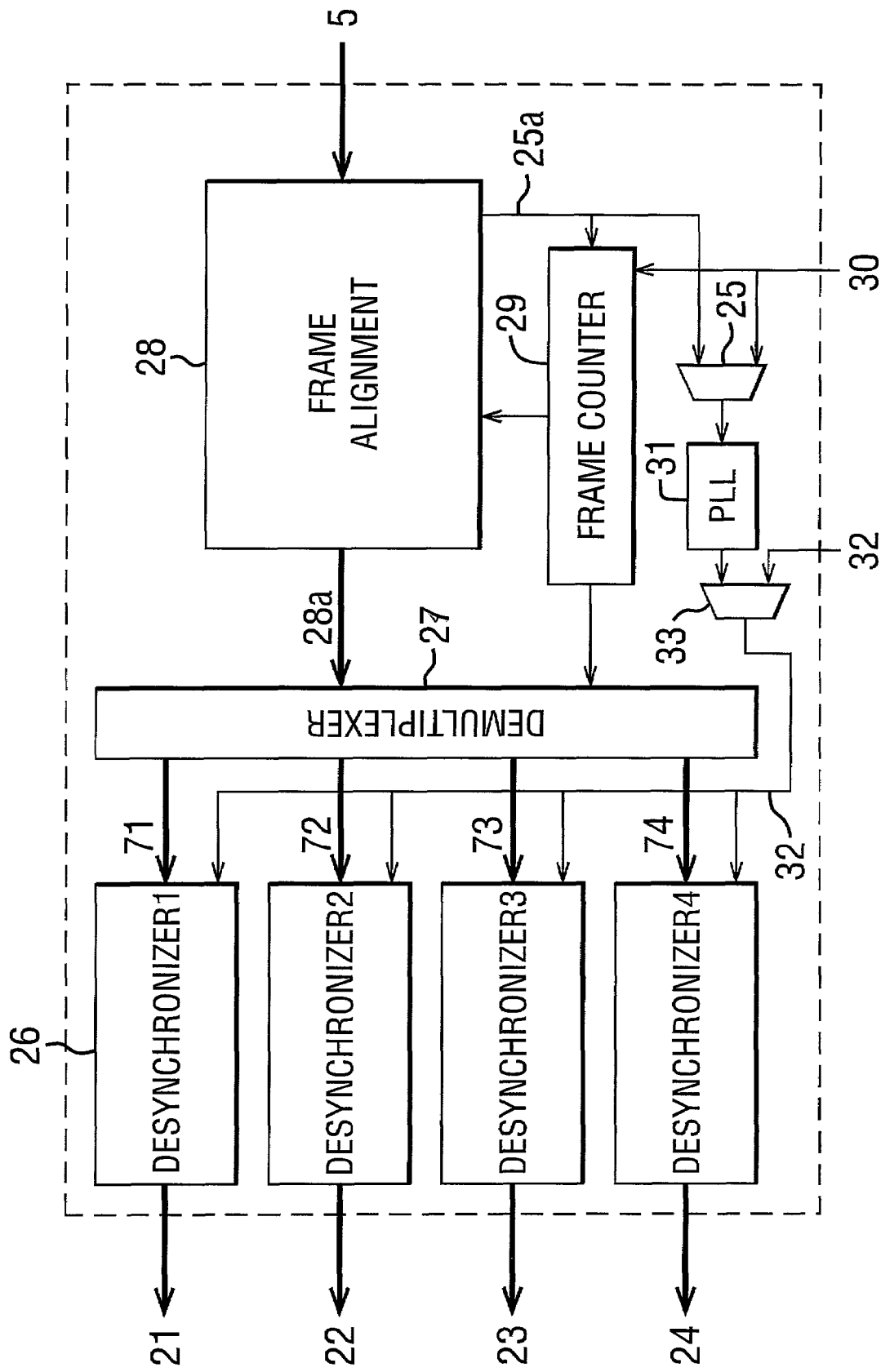
FIG. 3 is a block diagram of a receiver according to an illustrative embodiment of the invention.

FIG. 3 shows a receiver for four tributary data outputs 21, 22, 23, 24. These output lines 21 through 24 belong to respective desynchronizers 26, which are connected to demultiplexer 27. Demultiplexer 27 is controlled by a frame alignment circuit 28, which is interconnected with a frame counter 29. System clock 30 is connected to frame counter 29 and gate 25, which is also connected to the frame alignment circuit through a recovered clock line 25a. Gate 25 generates internally an auxiliary clock which is delivered to a phase-locked loop 31 which outputs to a gate 33 having a second input connected to a further auxiliary clock 32. The gated auxiliary clock is also connected to each desynchronizer 26.

Line 5 delivers the compound signal carrying the data of the tributary signals and also additional bits to the frame alignment circuit 28 which firstly outputs the data of the composed signal and secondly the recovered clock 25a of the compound signal. The recovered clock 25a is used in the frame counter 29 to decide when a frame begins and ends. Demultiplexer 27 receives the data of the composed signal 28a and is controlled by the frame counter 29 so as to deliver the appropriate rate adapted data 71 to 74 to the respective desynchronizer 26 in the adapted rate. The auxiliary clock 32 is used to reconstruct the initial frequency or rate of the respective desynchronizer 26 so that each tributary data output 21, 22, 23, or 24 has a frequency that is exactly the same as the initial frequency of the signal.

Figure 4:
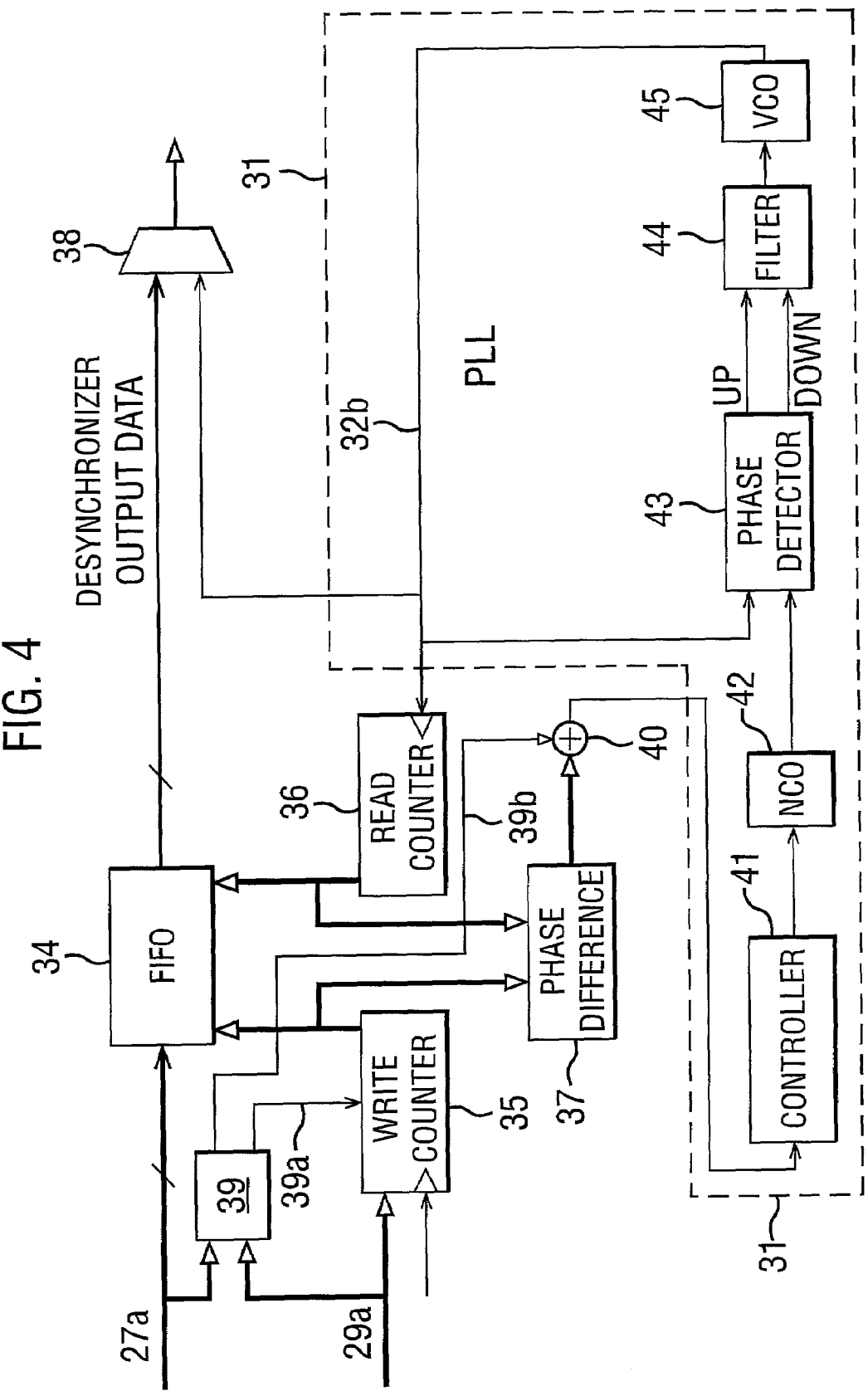
FIG. 4 is a block diagram of a desynchronizer according to an illustrative embodiment of the invention.

FIG. 4 shows a desynchronizer circuit 26 according to one illustrative embodiment. Data from demultiplexer 27 on line 27a is received at FIFO register 34, to which a write counter 35 and a read counter 36 as well as a phase difference unit 37 are connected. By way of example only, FIFO register 34 is an elastic store having write-in positions (write address) for the compound signal received, and read-out positions (read address) for the data bits of the respective tributary signals. Input line 27a is also connected to a phase and stuff information unit 39, which has a second input 29a from compound signal frame counter 29. Phase and stuff information unit 39 has a first output 39a for delivering stuff information to the write counter 35 and a second output 39b for delivering phase information to a summing member 40 which has a second input from the phase difference unit 37. The output of summing member 40 is the input of the phase-locked loop 31 which includes a controller 41, a numeric controlled oscillator 42, a phase detector 43, a filter 44 and a voltage-controlled oscillator 45. The output of the voltage-controlled oscillator is the read clock 32b and is also used as the tributary clock to an output data gate 38.

The data of the composed signal reaching demultiplexer 27 from the frame alignment circuit 28 are demultiplexed, so that signals 71 to 74 containing the additional bits in an adapted rate are obtained in succession in the several desynchronizers 26. Controlled by frame counter 29, the additional bits in the compound signal are read out from the rate adapted data stream of the tributary signal 27a into unit 39, whereas all bits in the compound signal are written into elastic store 34. The coded phase information taken up from unit 39 is used for an accurate calculation of the phase difference between the write and read address of the elastic store 34. The whole phase difference is calculated in phase difference unit 37.

The whole phase difference has several portions, including but not limited to: stuffing information (which is a rough quantization of the phase course, and is only transferred when a stuffing operation is actually made); synchronizer phase difference between write and read addresses (which has been calculated at the synchronizer and is transferred to the desynchronizer with specific bytes—this value is transferred regularly, one time per stuffing position independently from whether there is a stuffing operation, or not); and desynchronizer phase difference between write and read addresses (calculated at the desynchronizer as a mean or average value, in the same manner as at the synchronizer).

In one illustrative embodiment, the phase difference is represented by the addition of these portions and is added to the phase course of the system clock or cycle of the respective channel or tributary signal (when frame gaps removed) so as to yield the original phase course of the respective channel.

In detail, phase information as well as calculated phase difference is further processed for such clock recovery in the phase-locked loop 31. The loop includes a numeric controlled oscillator 42 so that the output signal thereof takes the initial frequency of the respective tributary signal 1, 2, 3, or 4. The phase-locked loop 31 is responsive for delivering the clock with the correct phase relation. When recovering the clock on line 32b, any phase deviation from the phase of an ideal clock of the same frequency is wander and jitter. Wander and jitter are kept low by the procedure described above, since the tributary clock on line 32b is recovered from the clock of the demultiplexed signal from which the gaps contained in the compound signals have been removed by virtue of the phase-locked loop 31. The additional bits in the regular gaps of the frame structure of the compound signal produce only low values of phase deviation since the phase-locked loop 31 has a low cut-off frequency. On the other hand, irregular gaps as occurring with stuffing produce irregular phase steps at the input of the phase-locked loop 31. This will produce big phase changes at the output of the phase-locked loop. However, the transmitted phase difference is used when recovering the clock in the receiver so that the clock produced in the phase-locked loop 31 is a clock with the desired phase for each tributary signal. The phase at the output of summing member 40 contains no more irregular and big phase steps.

What is claimed is:

1. A method of transmitting and receiving a plurality of individual tributary signals in multiplex form via a common line, the method comprising the steps of:
   converting, at the transmitting end, the individual tributary signals, each of which has a similar initial frequency, into a compound signal having a frame structure with a common data rate, and
   retrieving, at the receiving end, from the compound signal, each individual tributary signal with its initial frequency,
   wherein
   at the transmitting end, phase information including a respective phase difference between each tributary signal and the compound signal is formed and inserted into the compound signal in the form of respective coded bits, and,
   at the receiving end, the initial frequency of each tributary signal is recovered from the phase information included in the respective coded bits belonging to the respective tributary signals, wherein the phase difference between the compound signal and a tributary signal is calculated using an auxiliary clock, and
   further comprising the step of calculating a total phase difference, wherein the total phase difference is a function of stuffing information, a phase difference between write and read addresses at a synchronizer at the transmitting end, and a phase difference between write and read addresses at a desynchronizer at the receiving end.

2. The method according to claim 1, further comprising the step of calculating the phase difference between a tributary signal and the compound signal by calculating the difference between a write address and a read address of an elastic store.

3. An apparatus for transmitting and receiving a plurality of individual tributary signals in multiplex form via a common line, the apparatus including a transmitter having a plurality of synchronize, each operating on a respective individual tributary signal to produce a tributary signal having an adapted rate, and a multiplexer operable to interleave the adapted rate tributary signals within a compound signal, the apparatus further including a receiver having a demultiplexer operable to separate the compound signal into respective tributary signals having an adapted rate and a plurality of desynchronizers, each operating on a respective adapted rate tributary signal to obtain retrieved tributary signals, the apparatus further comprising:
   in the transmitter,
      means for calculating the phase difference between the compound signal and each tributary signal,
      means for coding the phase difference in bit form, and
      means for inserting the bits coding the phase difference into the compound signal; and
   in the receiver,
      means for reading out the bits coding the phase difference from the compound signal,
      means for recovering the frequency of the adapted rate tributary signals,
      means for adjusting the phase of the retrieved tributary signals, wherein the phase difference between the compound signal and a tributary signal is calculated using an auxiliary clock, and
      means for calculating a total phase difference, wherein the total phase difference is a function of stuffing information, a phase difference between write and read addresses at a synchronizer at the transmitting end, and a phase difference between write and read addresses at a desynchronizer at the receiving end.

4. The apparatus according to claim 3, wherein the transmitter and the receiver each include an elastic store that provides write addresses and read addresses for:
   writing in, at the transmitter, the data bits of the respective tributary signals and reading out these data bits together with bit gaps as provided by the frame structure of the compound signal; and
   writing in, at the receiver, the compound signal received and reading out the data bits of the respective tributary signals.

5. The apparatus according to claim 4, wherein the elastic stores each include:
   a write counter being operated by a write clock derived from an auxiliary clock; and
   a read counter being operated by a read clock derived from a phase-locked loop.

6. A method of receiving a plurality of individual tributary signals in multiplex form via a common line, the method comprising the steps of:
   receiving, at a receiving end, a compound signal that has a frame structure with a common data rate, the compound signal having been produced from individual tributary signals, each of which has a substantially identical initial frequency, and including a respective phase difference between each tributary signal and the compound signal inserted into the compound signal in the form of respective coded bits, and,
   retrieving, at the receiving end, from the compound signal, each individual tributary signal with its initial frequency,
   wherein at the receiving end, the initial frequency of each tributary signal is recovered from the phase information included in the respective coded bits belonging to the respective tributary signals,
   wherein the phase difference between the compound signal and a tributary signal is calculated using an auxiliary clock and,
   further comprising the step of calculating a total phase difference, wherein the total phase difference is a function of stuffing information, a phase difference between write and read addresses at a synchronizer at the transmitting end, and a phase difference between write and read addresses at a desynchronizer at the receiving end.

7. An apparatus for processing plurality of individual tributary signals that are received as via a common line as part of a compound signal that was produced by interleaving initial tributary signals having an adapted rate that were developed from independent tributary signals, the compound signal including in bit form the phase difference between the compound signal and each developed tributary signal, the receiver comprising:
- a demultiplexer operable to separate the received compound signal into respective tributary signals having an adapted rate; and
- a plurality of desynchronizers, each operating on a respective adapted rate tributary signal to obtain retrieved tributary signals;

means for reading out the bits coding the phase difference from the compound signal;

means for recovering the frequency of the adapted rate tributary signals; and means for adjusting the phase of the retrieved tributary signals;

wherein the phase difference between the compound signal and a tributary signal is calculated using an auxiliary clock.

* * * * *